United States Patent [19]
Lancier

[11] 3,974,856
[45] Aug. 17, 1976

[54] DISTRIBUTOR PANEL OR BOARD FOR COMPRESSED AIR MONITORING SYSTEMS

[75] Inventor: Peter Lancier, Munster-Angelmode, Germany

[73] Assignee: Peter Lancier K.G. Maschinenbau-Hafenhuette, Wolbeck, Germany

[22] Filed: Nov. 26, 1975

[21] Appl. No.: 635,378

[30] Foreign Application Priority Data
Dec. 19, 1974 Germany............................ 2460295

[52] U.S. Cl............................... 137/552; 137/559; 137/271; 200/81.9 M; 340/239 R; 73/209
[51] Int. Cl.²................... G08B 21/00; F16K 37/00
[58] Field of Search .......... 137/559, 552, 561, 608; 73/209; 200/81.9 M; 340/239 R

[56] References Cited
UNITED STATES PATENTS

| | | | |
|---|---|---|---|
| 2,628,297 | 2/1953 | Grauer | 200/81.9 M |
| 3,193,816 | 7/1965 | Brath | 340/239 R |
| 3,289,464 | 12/1966 | Byrkett et al. | 73/209 X |
| 3,699,560 | 10/1972 | Meunier et al. | 73/209 X |

FOREIGN PATENTS OR APPLICATIONS
1,812,883  6/1970  Germany

*Primary Examiner*—Henry T. Klinksiek
*Attorney, Agent, or Firm*—Edwin E. Greigg

[57] ABSTRACT

A distributor board or panel for compressed air monitoring systems including an integral die-cast distributor housing and a plurality of flow detectors. The housing has a longitudinal opening and surrounding structure to which the flow detectors are mounted for registry with a longitudinally extending common compressed air line through respective air supply lines which extend at right angles from the common compressed air line, and to respective air outlet lines which have cable connections associated therewith. The individual air supply lines and air outlet lines are also formed in the distributor housing. In each air supply line there is mounted an automatic closing stop valve which can be opened by a control pin mounted within the respective flow detector.

9 Claims, 2 Drawing Figures

DISTRIBUTOR PANEL OR BOARD FOR COMPRESSED AIR MONITORING SYSTEMS

BACKGROUND OF THE INVENTION

The present invention relates to a distributor board for compressed air monitoring systems, and more particularly, for electric cables under air pressure. The distributor board comprises a plurality of flow detectors disposed in a common distributor housing, with the flow detectors being connected both to a common compressed air line and to a cable to be supplied with compressed air, and with the detectors causing a signal to be emitted when a predetermined regulatable air flow is exceeded.

German Pat. Nos. 1,035,754 and 1,056,260 describe flow detectors in which the flow of compressed air to be monitored flows through a feed conduit towards a piston, which is displaceable in the feed conduit, and passes through lateral discharge openings provided in the conduit into a housing unit covered with an inspection glass, and from which it is discharged via a flow measuring glass. The flow measuring glass includes a float member and the level of the float floating on the air current in the flow measuring glass can be read from a scale and represents a measurement of the respective flow rate or quantity.

The piston disposed in the feed conduit is mounted in a position of equilibrium which is determined by the value of the air flow and by a spring force counteracting the latter. The piston is mounted in the region of the lateral discharge openings. Even minimal flow variations can cause the piston to change its position and this is used to activate a contact for producing a warning signal. The value of the flow required to produce such a triggering action can be adapted to suit different requirements.

Flow detectors of this type are used, for example, to monitor electric cables which are placed under air pressure to prevent the penetration of moisture. Any loss due to unavoidable sealing leaks in the cable must be compensated in order to maintain the pressure inside the cable. If the amount of air required to maintain this pressure, i.e., the flow to the cable, varies, this indicates that the cable is still subject to leakage or that it has been damaged. Flow detectors enable such a leak to be detected very rapidly.

At a cable distribution station, the flow detectors corresponding to the individual outgoing cables are generally grouped together on distributor panels which are mounted in a common frame, in which is located a compressed air line for each distributor panel, with compressed air supply lines for the individual flow detector branching from the common line. A stop valve which can be operated from the front side of the distributor panel to enable a defective cable to be disconnected from the compressed air supply is provided in the line leading to each flow detector. A flow quantity exceeding the tolerance limit is indicated by means of a warning light activated by means of the above-mentioned contact and the value of this flow quantity can be observed from the measuring glass.

On account of the sheet metal work involved, distribution panels of this nature are not only costly to produce because they give rise to high installation costs when the individual flow detectors are installed and connected up, but also require considerable space. This latter requirement can constitute a fairly substantial disadvantage if a large number of pressure gas cables are to be monitored.

OBJECT AND SUMMARY OF THE INVENTION

The principal object of the present invention is thus, to considerably reduce the space required by distributor panels of this type while simultaneously simplifying production of the individual components and also the assembly operations.

A related object of the present invention is to provide considerable flexibility in terms of the number of flow detectors which can be grouped together in a distributor panel by employing the principle of prefabricated parts.

These and other objects are achieved by the present invention by fabricating the distributor housing of the distributor panel as an integral die-cast element which includes a common compressed air line extending longitudinally of the housing and to which a plurality of air supply lines and an equal plurality of air outlet lines are connected. In each air supply line their is provide a stop valve, while between respective air supply lines and air outlet lines there is mounted to the housing a flow detector with means for opening the stop valve of its respective air supply line.

By producing the entire distributor housing as a die-cast element (injection molded element), it can be produced economically and with accurate dimensions. The compressed air lines are integrally cast in these injection-molded elements, thereby making it unnecessary to install them subsequently as is the case in the known systems. The individual flow detectors are disposed adjacent to one another, thus keeping the length of the individual distributor panels to a minimum. By means of automatic-closing stop valves provided in the compressed air supply lines, it is possible to install and operate a small number of flow detectors in a distributor housing which is intended, for example, for five or ten flow detectors, as the valves prevent compressed air from escaping from the common compressed air line through the unoccupied positions. In this way, only a few basic types of distributor housing units are suitable for use with any number of flow detectors.

If the individual flow detectors are rectangular in form, they can be disposed directly adjacent to one another with their sides in contact, such that, apart from obtaining a device of considerably reduced dimensions, the visual impression is that of a closed unit.

To obtain random closing of a stop valve in the case of an integrally molded flow detector, the control pin is advantageously displaceable in the axial direction such that when it is pushed inwards it opens the valve and, when the movement is oppositely directed, the valve is closed. An especially advantageous configuration for obtaining such a movement consists in the use of a curved (cam) guide, which, during rotation of the control pin, results in an axial movement of the pin; the curved guide comprising two stop positions for the two axial end positions of the control pin, thereby preventing unintentional actuation of the control pin. An advantageous form of curved guide can be obtained by means of a guide member which also serves as a bearing bushing and which comprises a curved end face, on which slides a sensing pin passing through the control pin at right angles thereto.

The control pin can be designed on one side for key actuation, for example, it can have a square end, a triangular end, etc. The front panel of the flow detector housing comprises an opening at this point, through which the key can be inserted.

An advantageous embodiment of the stop valve consists in that in the compressed air supply line there is provided a spring which is supported on a shoulder and which presses a valve element having a spherical, semispherical, conical, or similar suitable form, towards a bushing forming valve seat secured by bolts in the distributor housing. The control pin of the flow detector is directed towards the opening in the valve seat closed by the valve element and, when the pin is pressed inwards, the valve element is removed from the valve seat.

Other objects, features and advantages of the present invention will be made apparent from the following detailed description of a preferred embodiment thereof, provided with reference to the accompanying drawings.

DESCRIPTION OF THE PREFERRED EMBODIMENT

Figure 1:
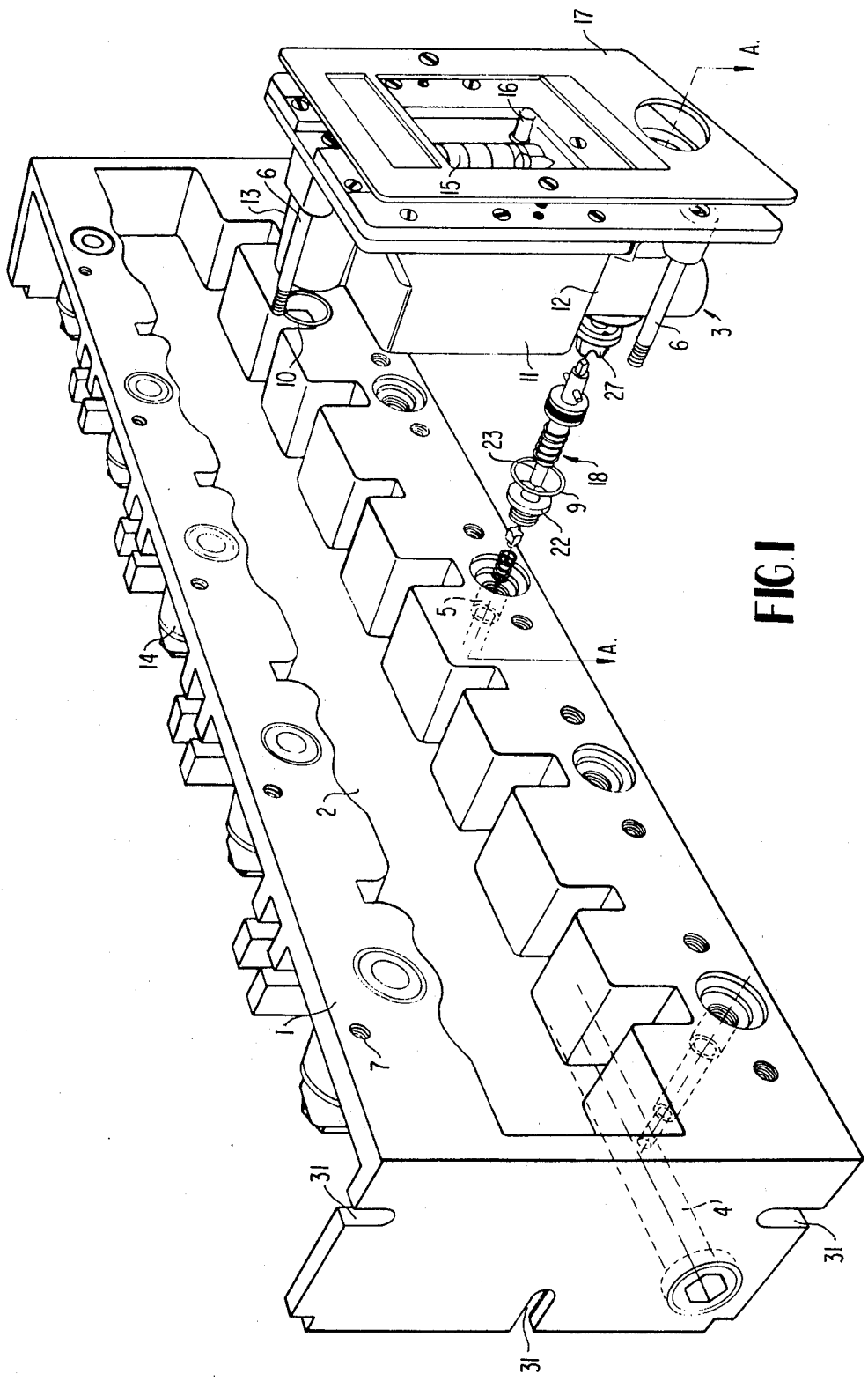
FIG. 1 illustrates a perspective view of a distributor housing according to the present invention and of a flow detector. Also illustrated in FIG. 1 is a large-scale view of the stop valve.

In FIG. 1, the distributor housing 1 is in the form of an integral die-cast element comprising a continuous opening 2 which reduces the amount of material used in the device and also its weight. A common compressed air line 4 which is connected to a source of purified, dried compressed air (not represented) extends in a longitudinal direction through the distributor housing 1. Individual compressed air supply lines 5 for the flow detectors 3 branch off the common compressed air line 4. The flow detectors 3 are secured by means of bolts 6 and threaded holes 7 provided in the distributor housing 1. In this way, connections are automatically provided between the compressed air supply line 5, the compressed air outlet line 8 and the flow detector 3. Sealing rings 9 and 10 provide a tight seal.

The individual flow detectors 3 comprise a housing 11 which is supplied with air from the compressed air supply line 5 through an air inlet 12. The air is discharged through an air outlet 13 and it passes through a compressed air outlet line 14 to a cable. In the housing of the flow detector 3, the measuring chamber of which is closed by means of a transparent front panel, there is located a flow measuring tube 15 in which a float indicates the respective flow quantity, unless a contact maker (not shown) causes an indicator light 16 to be illuminated when a predetermined flow quantity is exceeded. In the present case, the indicator light 16 preferably consists of a luminous diode. A cover plate 17 closes the front side of the flow detector. The covering hoods of the individual flow detectors are disposed directly adjacent to one another and thus, when the flow detectors are mounted in place, a continuous covering face is obtained.

Stop valves, generally designated by 18, are provided in the compressed air supply lines 5. The stop valves 18 are automatically closed if a flow detector 3 is not mounted in that particular position, thereby preventing compressed air from escaping at that point. In the embodiment represented, the compressed air supply line 5 comprises a shoulder 19 on which a spring 20 is supported. The spring 20 presses a valve element 21 against a valve seat 22 which is secured by bolts in the distributor housing 1. The sectional view provided in FIG. 2 clearly illustrates this structure.

Figure 2:
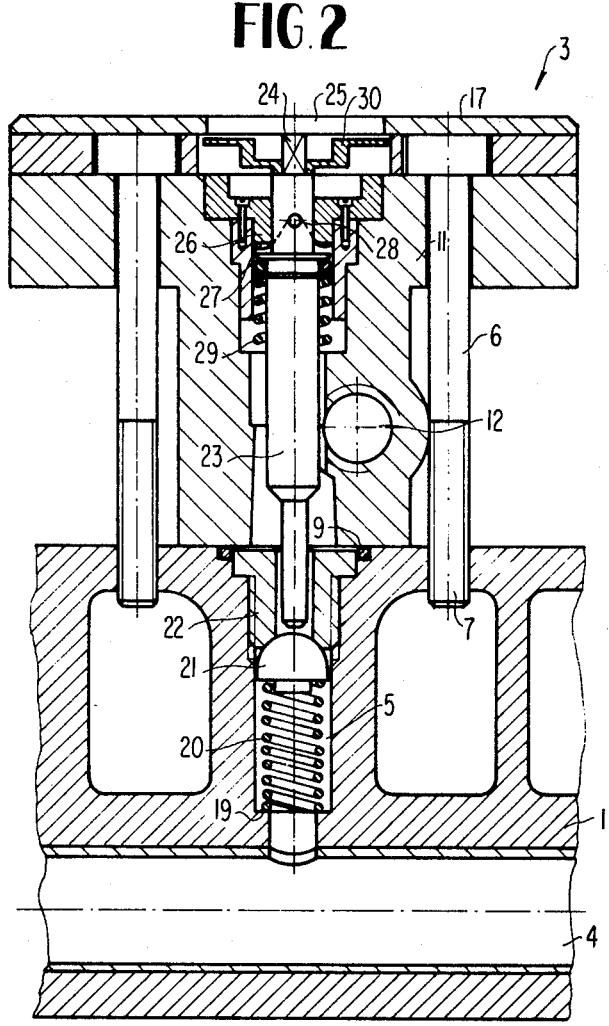
FIG. 2 is a section along the line A—A of FIG. 1.

The valve can be actuated by means of a control pin 23 mounted in the flow detector 3. One end of the valve pin 23 can be pressed through the valve seat 22 onto the valve element 21 which is raised from the valve seat, thus opening the valve. The control pin 23 is rotatably and axially displaceably mounted in the housing 11 of the flow detector 3. The other end of the pin 23 which is externally accessible consists of a square end 24 onto which a key can be placed through the opening 25 in the cover panel 17. By means of this key, the control pin 23 can be rotated. As indicated by FIG. 2, the control pin 23 is mounted in a guide member 26 which also serves as a bearing bushing. The guide member 26 includes a curved face 27 on which slides a sensing pin 28 passing at right angles through the control pin 23. When the control pin 23 is rotated by means of the key, the control pin is displaced in an axial direction through the cooperation of the sensing pin 28 with the curved face 27. In the course of a 90° rotation from the position indicated in FIG. 2, it presses, by means of its opposite end, onto the valve element 21 and opens the valve, thus enabling compressed air to flow from the common compressed air line 4 through the compressed air supply lines 5 and the air inlet 12, into the measuring chamber of the flow detector.

The sensing pin 28 is pressed by the action of a spring 29 against the curved face of the guide member 26 such that the control pin 23 remains locked in its two stop positions which correspond to the one end position represented in FIG. 2 and to a second end position in which the control pin 23 presses against the valve element 21 and keeps the valve open. The stop position which corresponds to the control pin end position, which is not represented in FIG. 2, is provided by the recesses in the curved face 27 indicated on both sides of the control pin 23 on this figure.

If necessary, the respective end position of the control pin and hence the respective valve position, can be indicated by an indicator 30 which is rotated by the control pin 23 and provides external indication of whether the valve pin is open or closed.

As is readily apparent from FIG. 2, the valve is always closed if there is no flow detector 3 in a particular position. When a flow detector has been mounted in place, it can be opened to permit operation of the cable connected thereto, by turning the control pin 23 by means of the key (not shown). During installation, the sealing rings 9 and 10 are used to seal the compressed air line 4 and compressed air supply line 5 with respect to the air inlet 12 and the air outlet 13 of the flow detector 3. As shown in FIG. 1, the distributor housing 1 is provided with attachment slots 31 by means of which it can be secured in a frame in which a plurality of distributor housing units can be combined to form a distributor panel. As is apparent from the above-described features and drawings, the pressure detector can be mounted in the distributor housing extremely easily as the compressed air connections are automatically produced when a flow detector 3 is mounted and screwed in place in a distributor housing 1. As is also apparent, the entire system is extremely compact. There is approximately a 60% space reduction over the known distributor panels, thus reducing the overall space required to less than ½ of that which was formerly required.

What is claimed is:

1. A distributor board or panel for compressed air monitoring systems, used preferably for electric cables under air pressure, comprising:
   A. a common distributor housing fabricated as an integral die-cast element, said housing having:
      i. a longitudinally extending common compressed air line;
      ii. a plurality of air supply lines branching off at right angles from the common compressed air line;
      iii. an equal plurality of air outlet lines which lead to cable connections; and
      iv. a longitudinally extending opening and surrounding structure;
   B. a plurality of flow detectors equal in number to the plurality of air supply lines, each said flow detector including a control pin and each said flow detector having means for producing a signal when a predetermined variable air flow is exceeded;
   C. mounting means for mounting each flow detector to the surrounding structure of the distributor housing forming thereby a row of adjacently arranged flow detectors each in registry with a respective air supply line and air outlet line; and
   D. a plurality of automatic closing stop valves each located in respective one of the air supply lines so that the control pin of the flow detector associated with the respective air supply line within which the stop valve is located can engage and open the stop valve.

2. The distributor panel as defined in claim 1, wherein each flow detector includes a rectangular housing unit.

3. The distributor panel as defined in claim 1, wherein each stop valve includes:
   i. a bushing defining a valve seat and a bore into which the control pin of the associated flow detector extends;
   ii. a valve element; and
   iii. means for biasing the valve element against the valve seat.

4. The distributor panel as defined in claim 3, wherein each bushing is provided at its outer surface with a thread for securing the bushing to the distributor housing and within a respective air supply line which is provided with a corresponding internal thread.

5. The distributor panel as defined in claim 1, wherein each flow detector further includes a housing within which the control pin is mounted and means mounting the control pin for axial displacement toward and away from the stop valve associated therewith.

6. The distributor panel as defined in claim 5, wherein said means for mounting the control pin for axial displacement includes a curved guide member means
   and further means cooperating with the curved guide member for achieving the axial displacement of the control pin during rotation thereof.

7. The distributor panel as defined in claim 6, wherein the curved guide member defines two stop positions corresponding to two axial end positions of the control pin, one of said end positions corresponding to an open condition of the stop valve and the other of said end positions corresponding to a closed condition of the stop valve.

8. The distributor panel as defined in claim 6, wherein the curved guide member includes an axial, curved face, wherein the curved guide member serves as a bearing bushing, and wherein the further means comprises a sensing pin which crosses the control pin at right angles and slides on the axial curved face of the curved guide member.

9. The distributor panel as defined in claim 6, wherein each flow detector further includes a panel member having an opening which provide access to the control pin, and wherein the end of the control pin facing away from the stop valve is in the form of a square end which can be engaged by a square key which is passed through the opening in said panel to thereby rotate the control pin and consequently cause a displacement of the valve element.

* * * * *